(12) United States Patent
Tavares Miranda

(10) Patent No.: US 10,780,944 B2
(45) Date of Patent: Sep. 22, 2020

(54) TRANSMISSION SYSTEM AND ITS USE

(71) Applicant: MIRANDA & IRMAO, LDA., Agueda (PT)

(72) Inventor: Joao Filipe Tavares Miranda, Agueda (PT)

(73) Assignee: MIRANDA & IRMAO, LDA., Agueda (PT)

( * ) Notice: Subject to any disclaimer, the term of this patent is extended or adjusted under 35 U.S.C. 154(b) by 406 days.

(21) Appl. No.: 15/754,950

(22) PCT Filed: Aug. 25, 2015

(86) PCT No.: PCT/PT2015/050004
§ 371 (c)(1),
(2) Date: Feb. 23, 2018

(87) PCT Pub. No.: WO2017/034428
PCT Pub. Date: Mar. 2, 2017

(65) Prior Publication Data
US 2020/0239104 A1    Jul. 30, 2020

(51) Int. Cl.
*B62M 9/10* (2006.01)
*B62M 9/00* (2006.01)

(52) U.S. Cl.
CPC ......... *B62M 9/10* (2013.01); *B62M 2009/005* (2013.01)

(58) Field of Classification Search
CPC ...... F16H 55/30; F16H 7/06; F16H 2055/086; F16H 55/08; F16H 57/0006
USPC .................................................. 474/152, 156
See application file for complete search history.

(56) References Cited

U.S. PATENT DOCUMENTS

| | | | | |
|---|---|---|---|---|
| 5,716,297 A * | 2/1998 | Bodmer | ................... | B62M 9/10 474/160 |
| 5,830,096 A * | 11/1998 | Schmidt | ................... | B62M 9/10 474/156 |
| 6,036,614 A * | 3/2000 | Baddaria | ................. | F16H 55/30 474/155 |
| 6,325,734 B1 * | 12/2001 | Young | ...................... | F16H 7/06 474/156 |
| 6,761,657 B2 * | 7/2004 | Young | ...................... | F16H 7/06 474/152 |
| 7,416,500 B2 * | 8/2008 | Young | ...................... | F16H 7/06 474/152 |

(Continued)

FOREIGN PATENT DOCUMENTS

| EP | 0522984 A1 | 1/1993 |
|---|---|---|
| EP | 1033509 A2 | 9/2000 |

(Continued)

OTHER PUBLICATIONS

International Search Report and Written Opinion dated May 18, 2016 for PCT/PT2015/050004.
IPRP dated Mar. 8, 2018 for PCT/PT2015/050004.

*Primary Examiner* — Henry Y Liu
(74) *Attorney, Agent, or Firm* — Lucas & Mercanti, LLP

(57) ABSTRACT

The present application describes a transmission system, including a certain tooth profile of toothed wheel and its use. This transmission system enables an improved guidance of the chain by using a non-normative tooth profile, to avoid that when the vehicle is exposed to extreme situations disengagements of the chain may occur. This transmission system applies to vehicles, preferably bicycles.

8 Claims, 1 Drawing Sheet

(56) References Cited

U.S. PATENT DOCUMENTS

| | | | | |
|---|---|---|---|---|
| 7,740,555 B2* | 6/2010 | Markley | ............... | F16H 7/06 474/156 |
| 10,578,201 B2* | 3/2020 | Reiter | ............... | B62M 9/105 |
| 10,584,785 B2* | 3/2020 | Kamada | ............ | F16H 55/0873 |
| 2003/0186766 A1* | 10/2003 | Wang | ............... | F16H 55/30 474/152 |
| 2004/0185977 A1* | 9/2004 | Young | ............... | F16H 55/30 474/202 |
| 2005/0009655 A1* | 1/2005 | Kubo | ............... | F16H 55/30 474/152 |
| 2006/0084542 A1* | 4/2006 | Kubo | ............... | B65G 23/06 474/206 |
| 2006/0122018 A1* | 6/2006 | Kubo | ............... | F16H 7/06 474/156 |
| 2013/0345005 A1* | 12/2013 | Yang | ............... | F16H 55/30 474/152 |
| 2013/0345006 A1* | 12/2013 | Yang | ............... | F16H 55/30 474/156 |
| 2015/0203173 A1* | 7/2015 | Nishimoto | ............ | B62M 9/02 474/152 |

FOREIGN PATENT DOCUMENTS

| | | |
|---|---|---|
| EP | 1348891 A1 | 10/2003 |
| EP | 1489338 A2 | 12/2004 |
| EP | 2677204 A1 | 12/2013 |
| EP | 2677205 A1 | 12/2013 |
| JP | S59-144855 A | 8/1984 |

* cited by examiner

TRANSMISSION SYSTEM AND ITS USE

CROSS REFERENCE TO RELATED APPLICATION

This Application is a 371 of PCT/PT2015/050004 filed on Aug. 25, 2015, which is incorporated herein by reference.

TECHNICAL FIELD

The present application describes a transmission system, including a certain tooth profile of toothed wheel and its use.

STATE OF THE ART

With the market introduction of transmission systems for 11-speed bicycle at the rear cassette of the bicycle, it was intuitive for the user to use a single speed in the front transmission gears.

Thus, this decreases the amount of toothed wheels, commonly denominated as plates, in the front transmission gears and the disappearance of the front derailleur, as only one speed is going to be used at that location.

This situation leads to some technical problems, because the chain deviation becomes greater than the one the toothed wheel is subjected in the front transmission gears and with the disappearance of the front derailleur disengagements begin to occur in cases of judder, namely in mountain, Downhill and Endurance use, where bicycles are subjected to high levels of judder and where is also necessary, in most cases, the use of bicycle with rear suspension. The existence of disengagements in these cases leads bicycle manufacturers to assemble chain guides in the front transmission gears in an attempt to minimize these same disengagements.

The existence of disengagements in these cases leads bicycle manufacturers to assemble chain guides in the front transmission gears in an attempt to minimize these same disengagements.

SUMMARY

The present application describes a transmission system comprising a toothed wheel with a non-normative tooth profile with an intermediate front radius (R2) inferior to the roller's radius of the chain (R6), with the formation of a gap (Fe), a roller's rear radius of passage (R3) with a value superior than the roller's radius of the chain (R6), with the formation of a gap (FS) and an intermediate rear radius intermediate rear radius (R4) with a lower value than the roller's radius.

In one embodiment, the roller's passage radius (R1) used in the transmission system is between 2 and 4 mm.

In a further embodiment, the gap (Fe) of the transmission system is inferior to 0.6 mm.

In yet another embodiment, the intermediate front radius (R2) of the transmission system is between 3.8 and 15 mm.

In one embodiment, the roller's passage rear radius (R3) of the transmission system is between 3.8 and 15 mm.

In a further embodiment, the intermediate rear radius (R4) of the transmission system is between 0.2 and 3.8 mm.

In yet another embodiment, the roller's radius of the chain (R6) of the transmission system is 3.8 mm.

The present application also describes a vehicle comprising the transmission system previously described.

The present application also describes a bicycle comprising the transmission system previously described.

GENERAL DESCRIPTION

The present application describes a transmission system that allows an improved guiding in the chain by using a non-normative tooth profile, so that when a rear gearbox is used, it is possible to have a single speed at the front transmission gears and wherein the guidance is effected on the front transmission gear's toothed wheel itself, but where the guiding is made in the roller and not in the side plates, since this last option presents the problem of high wear on the toothed wheel, which implies that with the passage of time the guiding ceases.

Throughout the present text, it is considered a non-normative tooth profile as a tooth profile in which the dimensions, namely height, width and depth, are not adequately standardized. Thus, the dimensions used are outside the ranges considered standard and/or values attainable with constructions obtained by CAD software.

The transmission system's tooth profile exhibits greater height than the normative tooth profile for improving and enabling the chain to be engaged earlier during normal operation and in cases of judder.

In order to improve the chain retention in extreme cases, two sets of radius were included in the toothed wheel profile, called R1/R2 and R3/R4 so that the chain, after engaged, is retained within the tooth profile, thus ensuring its retention, in cases of bigger judder while assuring that there is engagement in the upper part of the wheel, and disengagement at the bottom. Thus, the roller's front radius of passage (R1) works on the rear engagement part and the roller's rear radius of passage (R3) on the disengagement part. And the intermediate front radius (R2) and the intermediate rear radius (R4) having the function to trap the roller between R1, R3 and the engagement radius (R5), the latter corresponding to the profile bottom radius in cases of judder and cases of extreme vibration.

The advantages of the technology presented in this application compared to existing systems in the market are:
- Reduction of the system's cost as it is no longer necessary to assemble the chain guide;
- Reduction of complexity in the assembly of the system on the front axle as chain guidance systems are not needed;
- Decreasing the total weight of the transmission system;
- Less wear of the transmission system on the front transmission gears, because the guiding is made in the rollers and not on the side plates;
- Lower side wear;
- More energy-efficient, low losses of energy as the guiding is done in the roller;
- Less noise;
- Increased durability in the guiding system;
- In the event of disengagement, the transmission system does not suffer from problems.

The technical solution now disclosed has special application in the cases of all-terrain bicycles, bicycles with rear suspension, toothed wheels of electric bicycles and any other application where the current oscillation is a very important and significant variable.

One way to obtain the transmission system now disclosed would be to resort to the machining process by chip removal in a CNC milling machine for carrying out the tooth profile.

DESCRIPTION OF THE FIGURES

For easier understanding of the art, the attached figures are joined which represent preferred embodiments that however are not intended to limit the subject matter of this application.

DESCRIPTION OF EMBODIMENTS

Figure 1:
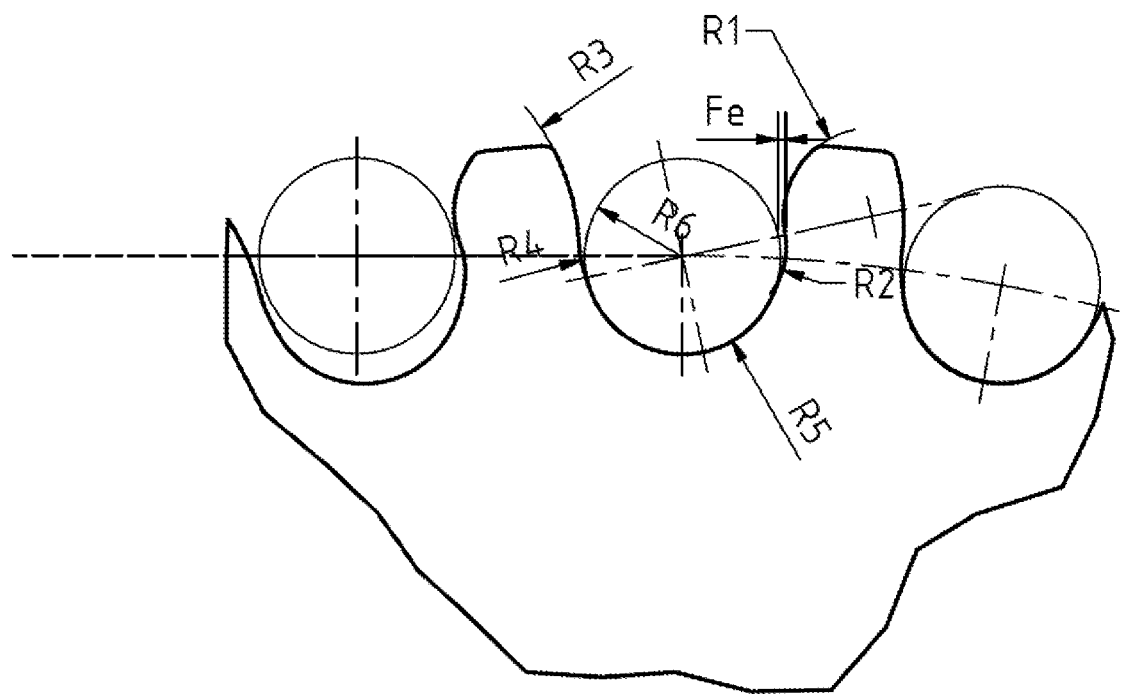
FIG. 1 schematically illustrates a view of the upper region of a toothed wheel in an engagement situation, in which the references are relative to:
R1—roller's front radius of passage;
R2—intermediate front radius
R3—roller's rear radius of passage;
R4—intermediate rear radius;
R5—engagement radius;
R6—roller's radius of the chain;
Fe—gap.
Figure 2:
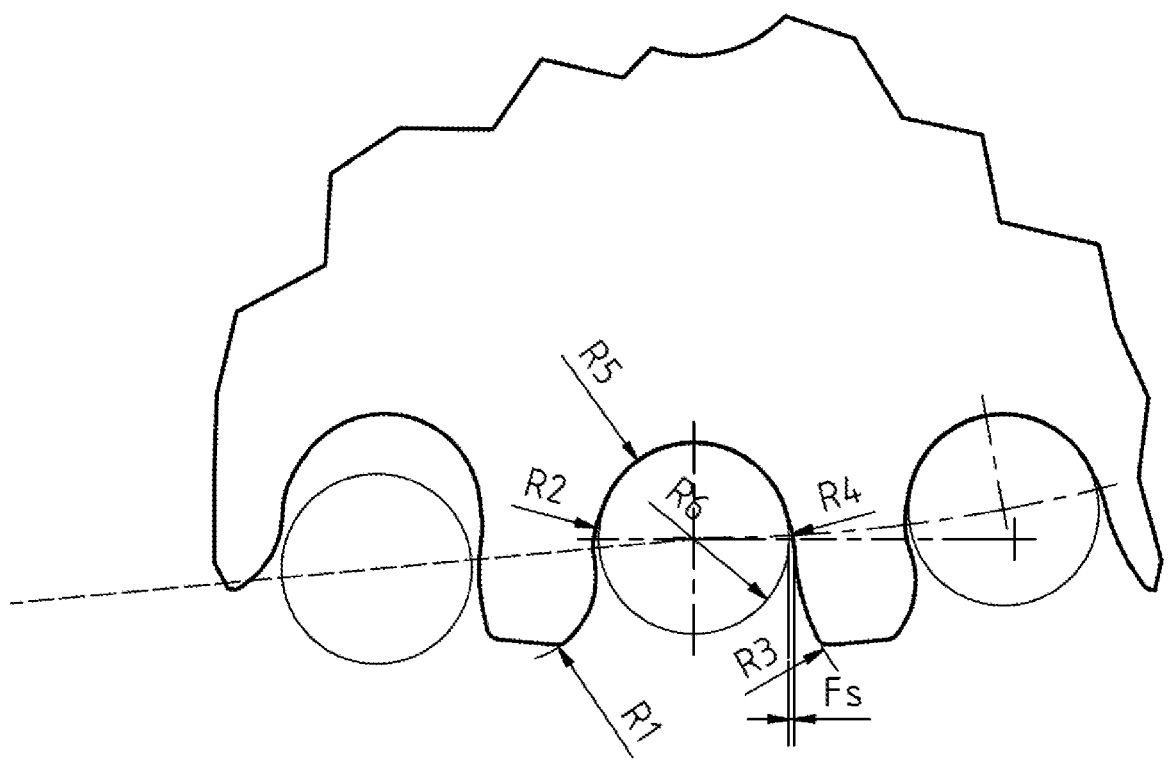
FIG. 2 schematically illustrates a view of the upper region of a toothed wheel in a disengagement situation, in which the references are relative to:
R1—roller's front radius of passage;
R2—intermediate front radius
R3—roller's rear radius of passage;
R4—intermediate rear radius;
R5—engagement radius;
R6—roller's radius of the chain;
Fs—gap generated between the roller's rear radius of passage (R3) and the roller.

The present application describes a transmission system comprising a non-normative tooth profile, allowing an improved guiding in the chain so that, when a rear gearbox is used, it is possible to have a single speed at the front transmission gears and wherein the guidance is effected on the front transmission gear's toothed wheel itself, but where the guiding is made in the roller and not in the side plates, since the last option has the problem of high wear on the toothed wheel, which implies that with the passage of time the guiding ceases.

The toothed wheel's tooth profile used is not normative, i.e. its geometric construction is not based on any standard or "cad" library.

The toothed wheel's tooth profile used is not normative, i.e. its geometric construction is not based on any standard or "cad" library. The tooth height used in the transmission system should be greater than 7.5 mm, preferably comprised between 7.5 mm and 12.0 mm. In an embodiment where there is a low number of teeth on the toothed wheel and the chain is well tight, the tooth height should be comprised between 8.0 mm and 12.0 mm. However, in the case of the embodiment comprising a low number of teeth on the toothed wheel, but where a low quality chain is used that does not allow a grip so much accomplished, the tooth height may be comprised between 7.8 mm and 12.0 mm. In a further embodiment where there is a high number of teeth on the toothed wheel and the chain is well tight, the tooth height should be comprised between 8.5 mm and 12.0 mm. However, in the case of the embodiment comprising a high number of teeth on the toothed wheel, but where a low quality chain is used that does not allow a grip so much accomplished, the tooth height may be comprised between 8.3 mm and 12.0 mm. In yet another embodiment, the tooth height may be comprised between 7.5 mm and 7.8 mm in cases where the pressure to be applied to the chain is not so high.

In order to improve the chain retention in extreme cases, two sets of radius were included on the toothed wheel profile, called R1/R2 and R3/R4 so that the chain, after engaged, is retained within the tooth profile, thus ensuring the retention of the same, in bigger judder cases while assuring that there is engagement in the upper part of the wheel, and disengagement at the bottom. Thus, the roller's front radius of passage (R1) works on the rear engagement part and the roller's rear radius of passage (R3) on the disengagement part. And the intermediate front radius (R2) and the intermediate rear radius (R4) having the function to trap the roller between the roller's front radius of passage (R1), the roller's rear radius of passage (R3) and the engagement radius (R5), the latter corresponding to the profile bottom radius in cases of judder and in cases of extreme vibration. The R5 value should always be comprised between 3 and 5 mm.

Thus, the roller's passage radius (R1) can have values comprised between 2 and 4 mm, and this radius has the function to obtain the gap (Fe) which may not exceed 0.6 mm. This gap is very important as the system may be subjected to heavy soiling, in particular in the case of mountain bikes, the system must have the ability to not block the functioning of the chain in these situations. This gap is created in the direction of a line drawn between the roller's center in the engagement state and the center of the roller's passage radius (R1). This radius also has the function to enable the engagement of the chain smoothly through the roller.

The intermediate front radius (R2) has the function of trapping the roller between the roller's passage radius (R1) and the intermediate rear radius (R4). The intermediate front radius (R2) has to present a radius smaller than the roller's radius of the chain (R6) thus ensuring that in case of vertical movement the roller touches the radius, but that it will not pass from it as the radius is more closed than the roller's radius of the chain (R6) that measures 3.8 mm. The value of R2 should always be greater than 3.8 mm, preferably between 3.8 and 15 mm.

The roller's rear radius of passage (R3) has a value above the roller's radius of the chain (R6) so that slippage of the roller occurs in the chain's disengagement zone, thereby enabling smooth disengagement when it is necessary to release the chain from the toothed wheel. Thus, the gap generated between the roller's rear radius of passage (R3) and the roller (Fs) is slightly greater than the gap (Fe) because the chain will have to be able to disengage smoothly avoiding the chain to wrap in the toothed wheel itself. This gap is in the orientation of a line drawn between the roller's center in the state of engagement and the center of the roller's rear radius of passage (R3). The value of R3 should always be greater than 3.8 mm, preferably between 3.8 and 15 mm.

The intermediate rear radius (R4) has lower values than the roller's radius so that until the disengagement zone and in the event of judder, this intermediate rear radius (R4) holds the roller between the roller's rear radius of passage (R3) and the engagement radius (R5). This radius is below the roller's exit zone, thereby releasing it when it is required that the chain to disengage from the wheel to reach the roller's rear radius of passage (R3). This exit zone occurs when the chain reaches an a exit angle, the angle being generated by the rear derailleur. The value of R4 should always be inferior than 3.8 mm, preferably between 0.2 and 3.8 mm.

One way to achieve a realization of this technology would be through a machining process by chip removal in CNC milling machine for carrying out the non-normative tooth profile. Yet another way of obtaining would be by a forging process.

The present embodiment is of course not in any way restricted to the embodiments described herein and a person of ordinary skill in the area can predict many possibilities to modifications thereof without departing from the general idea, as defined in the claims.

The preferred embodiments described above are of course combinable with one another. The following claims further define preferred embodiments.

The invention claimed is:

1. Transmission system comprising roller's passage radius (R1) of 2 to 4 mm, a toothed wheel with a non-normative tooth profile with an intermediate front radius (R2) equal or inferior to the roller's radius of the chain (R6), with the formation of a gap (Fe), a roller's rear radius of passage (R3) with a value equal or superior to the roller's radius of the chain (R6), with the formation of a gap (Fs) and an intermediate rear radius (R4) with a lower value than the roller's radius.

2. Transmission system according to claim 1, wherein the gap (Fe) is inferior than 0.6 mm.

3. Transmission system according to claim 1, wherein the intermediate front radius (R2) is between 3.8 and 15 mm.

4. Transmission system according to claim 1, wherein the roller's rear radius of passage (R3) is between 3.8 and 15 mm.

5. Transmission system according to claim 1, wherein the intermediate rear radius (R4) is between 0.2 and 3.8 mm.

6. Transmission system according to claim 1, wherein the roller's radius of the chain (R6) is 3.8 mm.

7. Vehicle characterized by comprising the transmission system described in claim 1.

8. Bicycle characterized by comprising the transmission system described in claim 1.

* * * * *